US006634861B1

(12) United States Patent  (10) Patent No.: US 6,634,861 B1
Altamura  (45) Date of Patent: Oct. 21, 2003

(54) POWER PLANT FOR PROPELLER AIRCRAFT

(75) Inventor: Paolo Altamura, Monopoli (IT)

(73) Assignee: Fiatavio S.p.A., Turin (IT)

( * ) Notice: Subject to any disclaimer, the term of this patent is extended or adjusted under 35 U.S.C. 154(b) by 430 days.

(21) Appl. No.: 09/619,952

(22) Filed: Jul. 20, 2000

(30) Foreign Application Priority Data

Jul. 20, 1999 (IT) .......................... TO99A0648

(51) Int. Cl.⁷ .................. B64C 29/00; B64C 27/28; B64C 35/00
(52) U.S. Cl. .................. 416/170 R; 416/148; 416/142; 244/7 R; 244/170; 74/410; 74/661; 74/665 GC
(58) Field of Search .............. 416/170 R, 121, 416/123, 130, 120, 142, 148; 244/7 R, 7 C, 56, 60; 74/410, 661, 665 GC

(56) References Cited

U.S. PATENT DOCUMENTS

| 2,479,406 | A | | 8/1949 | Rapuano | 74/423 |
| 4,142,697 | A | * | 3/1979 | Fradenburgh | 416/88 |
| 4,784,351 | A | * | 11/1988 | Eickmann | 244/7 C |
| 5,709,357 | A | * | 1/1998 | von Wilmowsky | 244/7 R |
| 5,823,470 | A | * | 10/1998 | Craig et al. | 244/7 R |
| 6,073,510 | A | * | 6/2000 | Tomaselli | 74/410 |

FOREIGN PATENT DOCUMENTS

| DE | 3 917 499 | | 12/1990 |
| EP | 0 926 395 | | 6/1999 |
| EP | 1057724 A2 | * | 12/2000 |
| GB | 962 430 | | 7/1964 |

OTHER PUBLICATIONS

Fischer, A. et al. "Propulsion System Concept for the Eurofar Tilt Rotary Aircraft" Proceedings of the European Rotorcraft Forum, Sep. 18–20, 1990. pp. II.5.1.1 to II.5.1.12.

* cited by examiner

Primary Examiner—Edward K. Look
Assistant Examiner—Richard Woo
(74) Attorney, Agent, or Firm—Carter J White; Howrey Simon Arnold & White LLP

(57) ABSTRACT

A power plant for propeller aircraft has two propulsion devices, each having a propeller, an engine for powering the propeller, and a gear transmission interposed between the engine and the propeller. The transmission has a power input shaft connected directly to the engine, and a power output shaft supporting the propeller and rotated with respect to the input shaft about a hinge axis perpendicular to the output shaft. The gear transmission also has a single gear fitted to the output shaft and having two opposed sets of teeth meshing with a pair of pinions. One of the pinions extends coaxially with the hinge axis, and is connected to the input shaft by a single pair of gears.

7 Claims, 1 Drawing Sheet

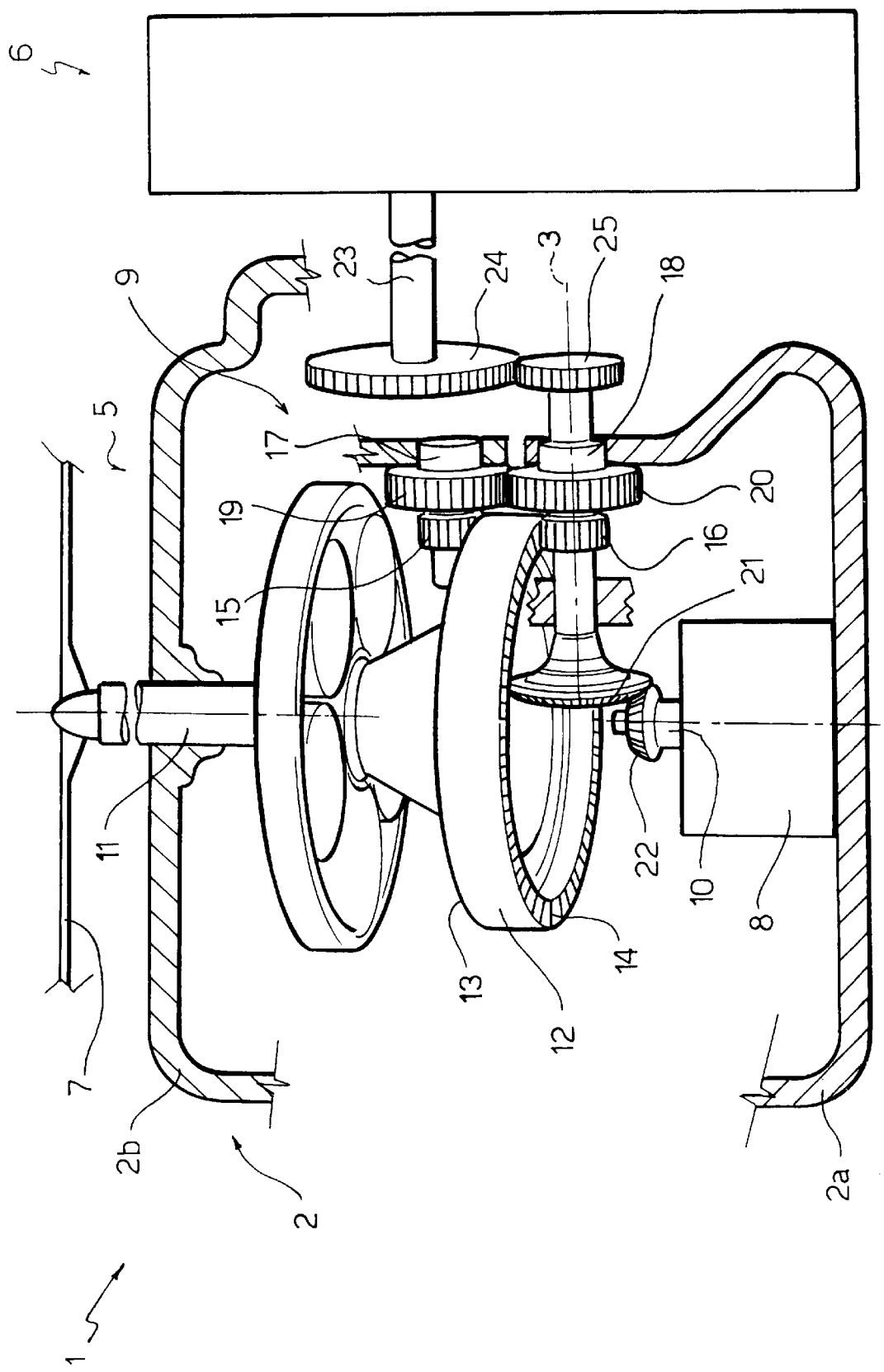

POWER PLANT FOR PROPELLER AIRCRAFT

BACKGROUND OF THE INVENTION

Aircraft are known which are powered by a power plant comprising two propeller devices, each of which in turn comprises an engine, a propeller, and a gear transmission interposed between the engine and the propeller and having an output shaft to which the propeller is fitted. Each propeller device rotates, about a substantially horizontal axis, between a first work position in which the respective output shaft is vertical and the propellers permit vertical takeoff of the aircraft in the same way as a helicopter, and a second work position in which the output shaft extends substantially horizontally and the propellers permit forward flight of the aircraft.

In most applications, the two propeller devices are connected by a counter shaft, so that, in the event either of the engines breaks down, the other provides for rotating both propellers.

Though widely used, known power plants of the above type leave considerable room for improvement, on account of the considerable force required and the relatively long time taken to rotate between said two positions, mainly due to the weight of the components for rotation.

Solutions are known in which the engines remain stationary with respect to the aircraft. Such solutions, however, only provide for partly solving the problem, on account of most of the components of each propeller device still being rotated about the respective horizontal axis. Moreover, the movement of the propeller with respect to the relative engine makes the transmission extremely complex, expensive, and, in some case, heavier than movable engine transmissions.

SUMMARY OF THE INVENTION

It is an object of the present invention to provide a power plant for propeller aircraft, designed to provide a straightforward, low cost solution to the problems typically associated with the known state of the art.

According to the present invention, there is provided a power plant for propeller aircraft, comprising two propulsion devices; each propulsion device comprising a respective propeller, a respective engine for powering the propeller, and a gear transmission interposed between the engine and the propeller and comprising a power input shaft connected directly to said engine, and a power output shaft supporting said propeller and rotated with respect to said input shaft about a hinge axis substantially perpendicular to the output shaft; said gear transmission also comprising a single gear fitted to said output shaft and comprising two opposed sets of teeth, a pair of pinions, each meshing with a respective said set of teeth, and, for each said pinion, a single respective gear meshing directly with the gear of the other pinion; characterized in that one of said pinions extends coaxially with said hinge axis, and is connected to said input shaft by a single pair of gears.

The gears in said single pair of gears are preferably bevel gears.

This therefore provides for obtaining a power plant for propeller aircraft, in which the propellers rotate with respect to the aircraft, while the respective engines remain stationary, and in which the loads involved in effecting rotation are considerably reduced, thus permitting faster, more reliable rotation of the propellers with respect to the aircraft.

Moreover, the gear transmission of the power plant according to the invention is considerably reduced with respect to that of the known state of the art, thus reducing the weight of the power plant as a whole.

BRIEF DESCRIPTION OF THE DRAWING

A nonlimiting embodiment of the present invention will be described by way of example with reference to the accompanying drawing, which shows an overall view in perspective of the power plant according to the present invention.

DETAILED DESCRIPTION OF THE INVENTION

Number 1 in the accompanying drawing indicates as a whole a power plant for a propeller aircraft (not shown). The power plant comprises a frame 2, in turn comprising a structure 2a fixed to a frame of the aircraft (not shown, for the sake of simplicity), and a movable structure 2b connected to structure 2a by a known hinge assembly (not shown) so as to rotate with respect to structure 2a about a fixed hinge axis 3.

With reference to the accompanying drawing, power plant 1 comprises two identical propulsion devices 5 and 6, one of which is shown partly in section, and the other schematically. Each device is normally connected to a wing of the aircraft, and comprises a respective propeller 7, a respective engine 8 for powering propeller 7 and connected integrally to fixed structure 2a, and a gear transmission 9 interposed between engine 8 and propeller 7. Transmission 9 comprises a power input shaft 10 connected directly in known manner to engine 8 and perpendicular to hinge axis 3; and a power output shaft 11, which extends perpendicular to hinge axis 3, is connected in rotary and axially-fixed manner to movable structure 2b, projects outwards through structure 2b, and is fitted in known manner with propeller 7.

Each transmission 9 also comprises a single gear 12, preferably a face gear, fitted to output shaft 11 and having two opposite rings of teeth 13 and 14; and a single pair of pinions 15 and 16 located on opposite axial sides of gear 12 and each meshing with a respective ring of teeth 13, 14. Pinions 15 and 16 are fitted to respective parallel shafts 17 and 18, which are also fitted with respective identical, mutually meshing spur gears 19 and 20.

Shaft 18 extends coaxially with hinge axis 3, and is connected to input shaft 10 by a single pair of bevel gears 21 and 22, preferably face gears, one of which is fitted to shaft 18 and the other to input shaft 10.

As shown in the accompanying drawing, the power plant also comprises a counter shaft 23, which extends between the transmissions, eccentrically with respect to hinge axis 3, and is connected to each of shafts 18 by a single pair of spur gears 24 and 25, one of which is fitted to shaft 23 and the other to shaft 18, on the opposite side of respective pinion 16 with respect to respective bevel gear 21.

In actual use, as of a first operating position shown in the accompanying drawing, wherein shafts 10 and 11 of each device extend in line and coaxial with each other, and respective propeller 7 lifts the aircraft, structure 2b can be rotated, with respect to respective structure 2a, about respective hinge axis 3 to rotate output shaft 11, gear 12 and pinion 15—which rotates in contact with pinion 16—into a position in which output shaft 11 is substantially horizontal and propeller 7 moves the aircraft forward.

Transmissions 9 described therefore not only provide for rotating shafts 11 of propellers 7, with respect to respective engines 8, about substantially horizontal axes 3, while leaving engines a stationary, but are also extremely lightweight and cheap to produce. This is substantially due to the fact that, in each device, a single gear 12 meshing with a single pair of pinions 15 and 16 is interposed between respective input shaft 10 and respective output shaft 11, and, above all, to the fact that one of the pinions is connected to engine 8 by a single pair of gears 21 and 22, and is also connected to the corresponding pinion on the other device by a single pair of conveniently spur gears 24 and 25. The presence of an extremely small number of gears and, in particular, of gears movable together with structure 2b, provides, with respect to known solutions, for considerably reducing the force required to rotate the output shaft between said operating positions.

Clearly, changes may be made to the power plant as described herein without, however, departing from the scope of the accompanying Claims. In particular, the bevel gears may be replaced by a different pair of gears, and the spur gears replaced by other, e.g. bevel, gears.

What is claimed is:

1. A power plant (1) for propeller aircraft, comprising two propulsion devices (5, 6); each propulsion device comprising a respective propeller (7), a respective engine (8) for powering the propeller (7), and a gear transmission (9) interposed between the engine (8) and the propeller (7) and comprising a power input shaft (10) connected directly to said engine (8), and a power output shaft (11) supporting said propeller (7), said power output shaft rotating about a hinge axis (3) substantially perpendicular to the output shaft (11); said gear transmission (9) also comprising a single gear (12) fitted to said output shaft (11) and comprising two opposed sets of teeth (13, 14), a pair of pinions (15, 16), each meshing with a respective said set of teeth (13, 14), and, for each said pinion (15, 16), a single respective gear (19, 20) meshing directly with the gear (19, 20) of the other pinion (15, 16); characterized in that one of said pinions (15, 16) extends coaxially with said hinge axis (3), and is connected to said input shaft (10) by a single pair of gears (21, 22).

2. A power plant as claimed in claim 1, characterized in that the gears (21, 22) in said single pair of gears are bevel gears.

3. A power plant as claimed in claim 1, characterized in that said pair of gears (21, 22) is a pair of face gears.

4. A power plant as claimed in claim 3, characterized in that one gear in said further pair of gears (24, 25) extends coaxially with said hinge axis.

5. A power plant as claimed in claim 3, characterized in that said counter shaft (23) extends eccentrically with respect to said hinge axis (3).

6. A power plant as claimed in claim 3, characterized in that the gears (24, 25) in said further single pair of gears are spur gears.

7. A power plant as claimed in claim 1, characterized by also comprising a counter shaft (23) extending between said two transmissions (9) and connected to one of said pinions (15, 16) of each transmission by a single further pair of gears (24, 25).

* * * * *